United States Patent [19]

Tanizaki et al.

[11] 4,291,101

[45] Sep. 22, 1981

[54] WOOD FIBROUS MATERIAL AND A METHOD FOR IMPROVING THE QUALITIES THEREOF

[75] Inventors: Yoshiharu Tanizaki; Kenichiro Minagawa, both of Yokohama; Shinichi Akimoto, Machida; Kuninori Horioka, Tokyo, all of Japan

[73] Assignee: Nippon Oil and Fats Co., Ltd., Tokyo, Japan

[21] Appl. No.: 64,314

[22] Filed: Aug. 6, 1979

[30] Foreign Application Priority Data

Aug. 11, 1978 [JP] Japan ................................. 53-97399

[51] Int. Cl.³ .................. B32B 23/08; B32B 27/10; B05D 3/00; B05D 3/02
[52] U.S. Cl. .................................. 428/514; 427/297; 427/391; 427/393
[58] Field of Search ............... 427/391, 393, 439, 440, 427/297; 428/513, 514

[56] References Cited

U.S. PATENT DOCUMENTS 3,704,161 11/1972 Yamaguchi et al. ........... 427/393 X
4,165,400 8/1979 DeMarco ........................ 427/393 X

OTHER PUBLICATIONS

Ericks, W. P., A Method for Dimensional Stabilization of Wood & Wood Veneer, pp. 1-3, Jul. 1958, Forest Products Journal, (vol. VIII, No. 7).

*Primary Examiner*—Michael R. Lusignan
*Attorney, Agent, or Firm*—Blanchard, Flynn, Thiel, Boutell & Tanis

[57] ABSTRACT

Wood fibrous materials which are impregnated with one or more compounds selected from a group consisting of polyoxyalkylene glycol monoacrylates and polyoxyalkylene glycol, monomethacrylates, followed by curing the impregnated impregnant, are splendid in the dimensional stability and become good in other properties thereof.

6 Claims, No Drawings

WOOD FIBROUS MATERIAL AND A METHOD FOR IMPROVING THE QUALITIES THEREOF

BACKGROUND OF THE INVENTION

1. FIELD OF THE INVENTION

This invention relates to improved wood fibrous materials and a method for improving the same which imparts dimensional stability to them.

2. DESCRIPTION OF THE PRIOR ART

Wood fibrous materials, including, for example, woods, processed woods, (hereinafter both are called woods), paper and processed paper have peculiar advantages in that they are easily obtainable, the processing thereof is simple, and they are light in weight, high in strength, low in thermal conductivity, low in specific heat and excellent in acoustic-and mechanical oscillating-absorptivity.

On the other hand, they have disadvantages in that they absorb water or get wet so that they swell, and when they are dried, they discharge the water contained therein so that they shrink, with the result being that they crack, deform and warp and also they are low in strength and their electric properties are degraded when they get wet or absorb water.

Heretofor, for the purpose of stabilizing wood fibrous materials against shrinking and swelling, which occur due to their hygroscopicity, and preventing deterioration of their other properties, methods for improving the qualities of the wood fibrous materials have been adopted comprising using polyethylene glycol (hereinafter called PEG) of a molecular weight of 200 to 4000 or using vinyl series monomers such as styrene, methyl methacrylate, 2-hydroxyethyl methacrylate and the like.

However, the method of using PEG has disadvantages in that when PEG having a molecular weight of from 200 to 1000 is used, the impregnation rate is rather high but the treated wood fibrous material is high in hygroscopicity and when PEG having a molecular weight of more than 1000 is used, the resulting wood fibrous materials are preferable in hygroscopicity but the impregnation rate of the PEG is low, with the result being that they are not sufficiently stabilized against swelling and shrinking and, moreover, a secondary procedure of cross-linking or curing by a diisocyanate or formaldehyde must be carried out for preventing elution of the PEG with the passage of time and the treated wood fibrous materials become generally low in the strength.

Further, the method of using hydrophobic vinyl monomers such as styrene, methyl methacrylate and the like, can not sufficiently stabilize the treated fibrous materials against swelling and shrinking and they become cracked with the passage of time and even if they are increased in density, or plasticized, or become harder, after the impregnation procedure, they lose their special property of impact strength.

SUMMARY OF THE INVENTION

A main object of the present invention is to provide wood fibrous materials which are splendid in dimensional stability without losing their peculiar characters and a process for producing the same.

The present invention is based on the knowledge that when wood fibrous materials are impregnated by vinyl monomers having polyoxyalkylene glycol groups followed by curing, wood fibrous materials having a splendid dimensional stability without losing their other special properties are obtained.

The present invention is characterized in that wood fibrous materials are impregnated with one or more compounds selected from the group consisting polyoxyalkylene glycol monoacrylate and polyoxyalkylene glycol monomethacrylate having the following formula (1), followed by curing

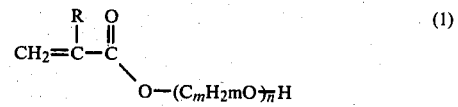

wherein R is a hydrogen atom or a methyl group, m is an integer of 2–4 and n is an integer of 2–20.

The term "wood materials" include woods, processed woods, paper and processed paper.

Typical polyoxyalkylene glycol monoacrylates and polyoxyalkylene glycol monomethacrylates which have the formula (1) and are used according to the present invention (hereinafter both are collectively called (metha)acrylate) are polyoxyethylene glycol mono(metha)acrylate, polyoxypropylene glycol mono(metha)acrylate, polyoxybutylene glycol mono(metha)acrylate, polyoxytetramethylene glycol mono(metha)acrylate, polyoxyethylenepropylene glycol mono(metha)acrylate, polyoxyethylenebutylene glycol mono(metha)acrylate, polyoxyethylenetetramethylene glycol mono(metha)acrylate, polyoxypropylenetetramethylene glycol mono(metha)acrylate, polyoxybutylenetetramethylene glycol mono(metha)acrylate, polyoxyethylenepropylenebutylene glycol mono(metha)acrylate, polyoxyethylenepropylenetetramethylene glycol mono(metha)acrylate, polyoxypropylenebutylenetetramethylene glycol mono(metha)acrylate, and polyoxyethylenepropylenebutylene tetramethylene glycol mono(metha)acrylate.

When the mole number (n) in a compound of the formula (1) is more than 20, the molecular weight of the compound is so high that the impregnation thereof into wood fibrous materials becomes difficult and good results can not be expected from the compound.

Further, when the mole number (n) of the compound of the formula (1) is smaller than 2, the treated fibrous material become too hard to have a sufficient dimensional stability.

The compound of the formula (1) according to the present invention, is impregnated into the wood fibrous material or applied on the same as it is or in a form of a solution.

As solvents for dissolving the compounds of the formula (1), there are mentioned aliphatic hydrocarbons, aromatic hydrocarbons, halogenated hydrocarbons, lower monohydric alcohols, polyhydric alcohols, ethers, acetals, ketones, esters, aliphatic acids, amines, nitro-compounds, sulphur-containing compounds, phosphoruscontaining compounds, water and the like.

Considering the workability and the impregnation rate of the compound of the formula (1), preferable solvents are mentioned as follows; water, lower monohydric alcohols such as methyl alcohol, ethyl alcohol, isopropyl alcohol, isobutyl alcohol, n-butyl alcohol and the like, polyhydric alcohols such as ethylene glycol, propylene glycol, diethylene glycol, dipropylene glycol, triethylene glycol, tripropylene glycol, glycerin and the like, polar solvents of glycol ethers such as ethylene glycol monoalkylether, propylene glycol monoalkylether, diethylene glycol monoalkylether, dipropylene glycol monoalkylether, triethylene glycol monoalkylether, tripropylene glycol monoalkylether and the like.

Because the compounds of the formula (1) are copolymerizable with vinyl monomers, for example, such as methyl (metha)acrylate, ethyl(metha)acrylate, propyl(metha)acrylate, butyl(metha)acrylate, vinyl acetate, hydroxyethyl(metha)acrylate, styrene and the like and also unsaturated polyester compounds, these compound may be used jointly with the compounds of the formula (1), depending on the purpose of improving the qualities of the resulting wood fibrous materials.

For curing the compounds of the formula (1) which are impregnated into the wood fibrous material or applied on the same, heat curing may be effected by subjecting the treated wood fibrous material to a temperature of more than 50° C., or they may be cured wherein curing is initiated by ionizing radiation, electron radiation or ultraviolet radiation, but, in general, polymerization initiators are preferably used for the curing.

As the polymerization initiators, there are mentioned peroxides and oxidation-reduction catalysts which are capable of polymerizing vinyl groups. Further, the wood fibrous materials which are impregnated with the compound of the formula (1), or to which the same is applied, if necessary, may be cured in the presence of an existing polymerization promotor which is represented by an amine or a metal soap.

To impregnate the compound of the formula (1) into a wood fibrous material more easily, nonionic-, cationic-, or anionic-surface active agents may be jointly used with the compound of the formula (1) in an amount of 0.01–10 weight percent based on the weight of the compound of the formula (1).

Further, if necessary, an antiseptic and an insecticide such as a 1–20wt% aqueous solution of sodium pentachlorophenol, boric acid or borax may be used with the compound of the formula (1).

The compounds of the formula (1) are obtained by subjecting acrylic acid, methacrylic acid, 2-hydroxyethyl acrylate, 2-hydroxyethyl methacrylate, 2-hydroxypropyl acrylate, or 2-hydroxypropyl methacrylate to an addition polymerization with ethylene oxide, propylene oxide, butylene oxide, or tetrahydrofuran, in the presence of a cationic catalyst such as boric trifloride, and stannic chloride and furthermore, they may be obtained by esterifying acrylic acid or methacrylic acid with PEG.

The compound of the formula (1) of the present invention may be applied for all sorts of wood fibrous materials, and they are very effective for high grade architectural woods, and outer wall woods which need strick dimensional stability, woods which are used under the conditions of frequently repeated cyclic changes in high humidity and in dryness, woods for floor boards which are required to be high in strength without losing their special characters and further wooden artistic handicrafts which are required to be stored for a long time.

The compounds of the formula (1) of the present invention are very effective for treating paper and processed paper for maintaining or upgrading their strength with keeping their suitable hygroscopicity and a good dimensional stability.

PREFERRED EMBODIMENTS OF THE INVENTION

EXAMPLES 1–15 Comparative Example

Test pieces were prepared from cross sectional specimens of Japanese Buna (Fagu crenata Blune) (of which the water content was controlled to 12 wt% by natural seasoning) and they were cut out according to the dimensions as shown in Table 2.

The compounds as shown in Table 1 were used as impregnation reagents and their respective formulas and the average molecular weights thereof were also as shown in Table 1.

TABLE 1

Impregnant used in Examples and Comparative Examples

| Code address | Structural formula | Average molecular weight |
|---|---|---|
| Example A | 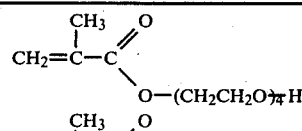 | 262 |
| B | 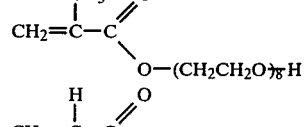 | 438 |
| C | 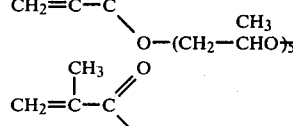 | 362 |
| D | 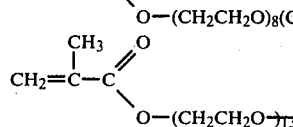 | 670 |
| E | 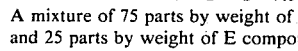 | 946 |
| A + E | A mixture of 75 parts by weight of A compound and 25 parts by weight of E compound | 433 |
| B + C | A mixture of 50 parts by weight of B compound and 50 parts by weight of C compound | 402 |

TABLE 1-continued
Impregnant used in Examples and Comparative Examples

| Code address | | Structural formula | Average molecular weight |
|---|---|---|---|
| | B + D | A mixture of 25 parts by weight of B compound and 25 parts by weight of D compound | 496 |
| Comparative Example | F | PEG HO—CH$_2$CH$_2$O—(CH$_2$CH$_2$O)$_{20}$CH$_2$CH$_2$OH | 986 |
| | G | $CH_2{=}\overset{\underset{\displaystyle CH_3}{\mid}}{C}{-}\overset{\displaystyle O}{\underset{\displaystyle O\,CH_2CH_2OH}{C{\diagup}\diagdown}}$ | 130 |
| | H | $CH_2{=}\overset{\underset{\displaystyle CH_3}{\mid}}{C}{-}\overset{\displaystyle O}{\underset{\displaystyle O\,CH_3}{C{\diagup}\diagdown}}$ | 101 |

TABLE 2
Dimension and properties of test piece used

| | |
|---|---|
| Specific gravity | 0.58–0.60 |
| Annual ring width (mm) | 1.9–2.0 |
| Dimension (mm) | |
| Tangential direction | 30 |
| Radial direction | 30 |
| Horizontal direction | 5 |

Impregnation was carried out by a process which comprised setting a test piece in an autoclave which is kept under a vacuum of 10 mm Hg for 10 minutes, pouring the reagent into the autoclave after de-airing whereby the impregnant is impregnated into the test piece under a vacuum of 10 mm Hg for 10 minutes and keeping the test piece under an ambient atmosphere for 20 minutes, thereby to impregnate the impregnant into the test piece.

When the impregnant was used alone, or in a solution of a solvent except water, as the curing catalyst of the impregnant, t-butylperoxy-2-ethylenehexanoate was used, and when the impregnant was used in a aqueous solution thereof, potassium persulfate was used. They were used respectively in amounts of 0.5 wt% based on the impregnant.

After the impregnation of the impregnant, the respective test pieces were heated at 120° C. in an air bath for one hour for curing or drying thereof.

Next, the respective heat treated test pieces were processed using water according to the same procedures as employed in the impregnation procedures of the aforementioned impregnant.

The respective test pieces were measured in the tangential direction.

Then, the respective anti-shrinkage efficiency (hereinafter called ASE) and the respective anti swelling efficiency (hereinafter called AE) for the respective test pieces were calculated according to the following definitions and formula.

$W_0$; the weight of the test piece in the oven dried condition (herein after called test piece (a))

$L_0$; the length of the test piece (a) in the tangential direction $W_1$; the weight of the test piece before the impregnation procedure (hereinafter called test piece (b))

$L_1$; the length of the test piece (b) in the tangential direction $W_2$; the weight of the test piece after the impregnation procedure (hereinafter called test piece (C))

$L_2$: the length of the test piece (C) in the tangential direction thereof $W_3$: the weight of the test piece after the curing and drying procedure (120° C.×1 hour) (hereinafter called test piece (d))

$L_3$; the length of the test piece (d) in the tangential direction thereof $W_4$; the weight of the test piece which was treated according to the aforementioned procedures, followed by impregnation of water thereinto (hereinafter called test piece (e))

$L_4$; the length of the test piece (e) in the tangential direction $W_5$; the weight of the test piece (e) after drying at 120° C. for one hour (hereinafter called test piece (f))

$L_5$; the length of the test piece (f) in the tangential direction thereof $$ASE = \frac{S_o - S_1}{S_o} \times 100$$

$S_0$; percentage of shrinkage of water treated wood (at blank test)

$$S_o = \frac{L_4' - L_5'}{L_o} \times 100$$

$S_1$; Percentage of shrinkage of impregnation reagent treated wood $$S_1 = \frac{L_4 - L_5}{L_o} \times 100$$

$$AE = \frac{D_o - D_1}{D_o} \times 100$$

$D_0$; Percentage of swelling of water treated wood (at blank test)

$$D_o = \frac{L_4' - L_3'}{L_o} \times 100$$

$D_1$: Percentage of swelling of impregnation reagent treated wood $$D_1 = \frac{L_4 - L_3}{L_o} \times 100$$

Wherein $L_3'$, $L_4'$, and $L_5'$ are respectively the length in the tangential directions corresponding to the length of $L_3$, $L_4$ and $L_5$ when the respective piece was treated with only water.

The obtained ASE and AE for the test pieces are shown in Table 3 and further.

|  | Impregnant | Form in usage of impregnant | ASE % | AE (%) | Existence of crack |
|---|---|---|---|---|---|
| Example 1 | A | 30% aqueous solution | 29.5 | 71.4 | none |
| 2 | A | 70% aqueous solution | 63.6 | 85.4 | none |
| 3 | A | 30% methanol solution | 35.4 | 50.0 | none |
| 4 | B | 30% aqueous solution | 32.3 | 74.1 | none |
| 5 | B | 100% | 87.6 | 81.4 | none |
| 6 | B | 30% methanol solution | 34.7 | 53.2 | none |
| 7 | C | 100% | 85.3 | 79.6 | none |
| 8 | D | 30% aqueous solution | 26.9 | 64.7 | none |
| 9 | E | 30% aqueous solution | 28.1 | 65.0 | none |
| 10 | A + E | 50% aqueous solution | 42.4 | 76.1 | none |
| 11 | A + E | 100% | 86.2 | 83.7 | none |
| 12 | B + C | 30% aqueous solution | 34.1 | 71.9 | none |
| 13 | B + C | 30% methanol solution | 35.6 | 51.7 | none |
| 14 | B + D | 50% aqueous solution | 45.3 | 77.3 | none |
| 15 | B + D | 50% aqueous solution | 46.5 | 64.2 | none |
| Comparative Example 1 | F | 30% aqueous solution | 4.4 | 39.7 | recognized |
| 2 | F | 50% aqueous solution | 5.6 | 47.9 | none |
| 3 | G | 30% aqueous solution | 1.0 | 9.4 | recognized |
| 4 | H | 100% | 35.1 | 37.8 | none |

Inspection was performed to determine whether or not cracks existed in the respective test pieces.

It was recognized that there were no cracks in the test pieces of Comparative Example 2 and 4, but both were small in ASE and AE, and were smaller than those of Example 5 and 7 in ASE and AE, even though all of them were impregnated with the respective impregnant of 100% concentration.

Elution test for the impregnant in the test pieces The test pieces used in the elution test were the treated test pieces of Example 1, Example 4, Example 10, Example 13 and comparative Example 1.

The elution rate of the impregnant which was impregnated into the test piece was calculated according to the following formula $$\text{Elution rate of an impregnant} = \frac{W_3 - W_5}{W_3 - W_0} \times 100$$

(wherein $W_0$, $W_3$ and $W_5$ are defined in the foregoing)

The obtained results are shown in Table 4.

It was recognized clearly from Table 4 that the elution rate of the impregnant in the respective test piece, which was treated according to the present invention, was smaller than that of the impregnant in the test piece of Comparative.

TABLE 4

| Test Piece | Elution Test Code address of impregnant | Effluent rate (%) |
|---|---|---|
| Example 1 | A | 16 |
| Example 4 | B | 20 |
| Example 10 | A + E | 13 |
| Example 13 | B + C | 18 |
| Comparative Example 1 | F | 53 |

Examples 16–19, Comparative Example 5 Test for Hardness

The hardness of the test pieces was measured according to Japanese Industrial Standard JIS-Z-2117-63.

Test pieces were prepared from the same material used in Example 1-15 and Comparative Example 1-4, and were impregnated with the respective impregnants as shown in Table 5 in 70 wt% aqueous solution thereof and the resulting test pieces were treated respectively according to the same procedures as that described in Example 1-15.

The obtained results are shown in Table 5.

TABLE 5

| | | Results of Hardness test Hardness (kg/mm²) | | |
|---|---|---|---|---|
| Test No. | Code address of Impregnant | Cut end | Straight grain | Cross grain |
| Example 16 | A | 7.4 | 6.3 | 6.1 |
| Example 17 | B | 6.8 | 5.5 | 5.2 |
| Example 18 | A + B | 6.8 | 5.9 | 6.2 |
| Example 19 | B + C | 7.6 | 5.8 | 5.5 |
| Comparative Example 5 | F | 3.9 | 1.5 | 1.4 |

Test No. 20–23, Comparative compound No. 6

Dimensional stability tests were carried out on paper as the wood fibrous material.

The test piece of the paper used was raw laminated paper consisting mainly of α-cellulose. The dimension of the test piece of the paper was as follows.

| | |
|---|---|
| Thickness of the test piece of the paper; | 0.2 mm |
| Length of the test piece of the paper in paralled to the direction of Fourdrinier paper machine; | 20 cm |
| Length of the test piece of the paper in perpendicular to the direction of Fourdrinier paper machine; | 25 cm |

The test piece of the paper was treated for the dimensional stability test according to the same procedures as that described in Nos. 1-15, except that the heating was carried out at 80° C. for one hour in an air bath.

The dimension of the test pieces of the paper was measured in directions parallel and perpendicular to the direction of the Fourdrinier paper machine whereby ASE was calculated.

The obtained results are shown in Table 6. It was recognized from Table 6 that the test pieces of the papers which were treated according to the present invention were good in the dimensional stability, high in the increasing rate of the weight and large in the remaining ratio of the impregnant.

TABLE 6

| Test piece No. | Code address of impregnant | Form of usage of impregnant | Increasing[1] rate of weight % | ASE Parallel to the direction of Fourdrinier paper machine | ASE Perpendicular to direction of Fourdrinier paper machine |
|---|---|---|---|---|---|
| Example 20 | A | 30 wt % aqueous solution | 20.4 | 37.8 | 46.1 |
| Example 21 | B | 30 wt % aqueous solution | 15.1 | 40.7 | 47.4 |
| Example 22 | A + E | 30 wt % aqueous solution | 18.3 | 36.1 | 43.9 |
| Example 23 | B + C | 30 wt % aqueous solution | 17.1 | 38.4 | 45.3 |
| Comparative Example | F | 30 wt % aqueous solution | 1.8 | 2.1 | 6.5 |

TABLE 6-continued

| Test piece No. | Code address of impregnant | Form of usage of impregnant | Increasing[1] rate of weight % | ASE Parallel to the direction of Fourdrinier paper machine | ASE Perpendicular to direction of Fourdrinier paper machine |
|---|---|---|---|---|---|
| 6 | | | | | |

Note:
[1] Increasing rate of weight = $\frac{W_5 - W_o}{W_o} \times 100$

The embodiments of the invention in which an exclusive property or privilege is claimed are defined as follows:

1. Wood fiber material impregnated with a polymer made of one or more monomers having the formula

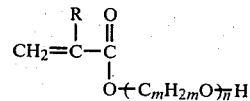

wherein R is hydrogen or methyl, m is an integer of from 2 to 4 and n is an integer of from 2 to 20.

2. A method of improving the dimensional stability of wood fibrous material, which comprises impregnating said wood fibrous material with one or more monomers having the formula

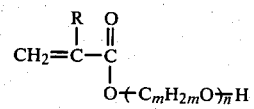

wherein R is hydrogen or methyl, m is an integer of from 2 to 4 and n is an integer of from 2 to 20, and then subjecting said wood fibrous material to polymerization conditions effective to polymerize said monomer in situ in said wood fibrous material.

3. The process of claim 2 in which the wood fibrous material is wood or processed wood.

4. The process of claim 2 in which the wood fibrous material is paper or processed paper.

5. The process of claim 2 in which said monomer is impregnated into the wood fibrous material in the form of a solution thereof in a polar solvent.

6. The process of claim 5 in which the solvent is water.

* * * * *